United States Patent [19]

McWilliams

[11] 4,248,310
[45] Feb. 3, 1981

[54] SKIP ROW CULTIVATORS

[76] Inventor: William R. McWilliams, Rte. 2, Box 46, Spur, Tex. 79370

[21] Appl. No.: 52,790

[22] Filed: Jun. 28, 1979

[51] Int. Cl.³ .......................... A01B 3/34; A01B 15/00
[52] U.S. Cl. .................................... 172/661; 172/662; 172/763
[58] Field of Search ............... 172/661, 662, 650, 655, 172/744, 213, 229, 483, 668, 699, 712, 762, 763

[56] References Cited
U.S. PATENT DOCUMENTS

| 925,362 | 6/1909 | Lucier | 172/661 |
| 3,058,243 | 10/1962 | McGee | 172/661 X |
| 4,194,573 | 3/1980 | Rettkowski | 172/699 |

Primary Examiner—George J. Marlo
Attorney, Agent, or Firm—Wendell Coffee

[57] ABSTRACT

The moveable plow shanks upon a skip row cultivator are mounted for vertical sliding motion. Each shank has a hydraulic cylinder connected to it by a flexible hydraulic line so that the tool bar to which the shanks are connected may be folded. By selectively energizing the hydraulic cylinders by a single valve, alternate cultivators are placed in the cultivating or non-cultivating position.

10 Claims, 5 Drawing Figures 4,248,310

SKIP ROW CULTIVATORS

BACKGROUND OF THE INVENTION (1) Field of the Invention.

This invention relates to earth working and more particularly agricultural cultivators for cultivating row crops planted in skip row cultivation so that selected rows may be cultivated or not cultivated.

(2) Description of the Prior Art.

In agricultural practices often it is desirable to plant row crops in a skip row configuration with two rows planted and one row skipped. When the crop is cultivated, the cultivators normally move up one set of rows and down the next cultivating the field. This causes the same plow upon the cultivator implement to be above a planted row when going in one direction and a skip or blank row when going in the other. It is desirable to have the blank row cultivated but it is, of course, necessary to transfer the plow into a non-cultivating position when moving in the opposite direction. This situation is illustrated in FIG. 1 as will be explained more particularly later on.

Prior to my invention cultivators to solve this problem were commercially upon the market which would have cultivator shanks mounted upon an eccentric tool bar. Then at the end of moving in one direction the tool bar would be rotated sufficiently to bring one set of plows down and the other set of plows up. However, this required a rigid tool bar. In modern agriculture today often a very long tool bar is used. For maneuverability in transportation of the equipment from one location to another it is desirable to have these long tool bars fold. I.E., there is a central portion of the tool bar with wings on each side which fold upward. Therefore, having a rotating eccentric tool bar was not compatible with folding wings and the farmer could not have such a system with a folding wing tool bar.

Before filing this application the applicant caused search to be made in the United States Patent and Trademark Office. That search revealed the following U.S. Pat. Nos.:

Bergeland 1,711,485
Bickerton 1,808,759
Legendre 2,053,618
McGee 3,058,243
Haverdink 3,967,684

MCGEE discloses an earthworking apparatus with a plurality of chisel teeth. Each of the chisel teeth are slideable up and down on the tool bar which is in cylindrical form. The back of each shank is in the form of a rack with teeth thereon. A pinion mounted upon a common shaft engages the rack so that the shanks may be raised and lowered.

HAVERDINK shows the folding wing cultivator as discussed above.

BICKERTON discloses a planting apparatus where the opening discs for the planter are each adjustable by an individual hydraulic cylinder so that each of the discs runs the same uniform depth for planting the seed.

The other two patents do not seem as pertinent as those specifically discussed above.

SUMMARY OF THE INVENTION (1) New and Different Functions

I have invented a new way to cultivate the skip or blank rows. I do this by sliding each shank vertically up and down within a loop clamped to the tool bar. The shank is moved up and down by hydraulic cylinder connected by flexible hoses. Therefore, the system is all of the cylinders compatible with a folding cultivator.

The cylinders are connected to a hydraulic pump by a valve so that in one position all of the shanks are in the proper position to plow in one direction and in the other position they are in the proper position to plow in the other direction.

This, it may be seen that the total function of my invention far exceeds the sum of the functions of the individual shanks, plows, hoses, etc.

(2) Objects of this Invention

An object of this invention is to cultivate skip row agricultural fields.

Further objects are to achieve the above with a device that is sturdy, compact, durable, lightweight, simple, safe, efficient, versatile, ecologically compatible, energy conserving, and reliable, yet inexpensive and easy to manufacture, install, adjust, operate and maintain.

Other objects are to achieve the above with a method that is versatile, ecologically compatible, energy conserving, rapid, efficient, and inexpensive, and does not require skilled people to install, adjust, operate, and maintain.

The specific nature of the invention, as well as other objects, uses, and advantages thereof, will clearly appear from the following description and from the accompanying drawing, the different views of which are not scale drawings.

DESCRIPTION OF THE PREFERRED EMBODIMENT

Figure 1:
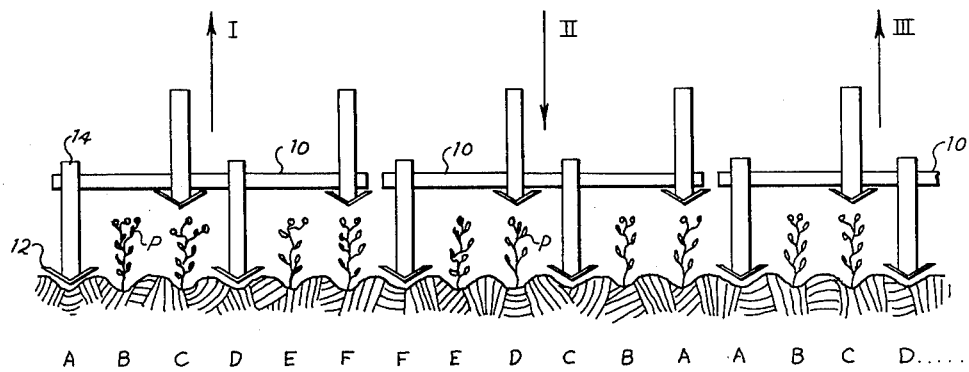
FIG. 1 is a schematic representation of the invention as it would be used on skip row planted land.

Referring to the schematic representation of FIG. 1 there may be seen represented an agricultural field planted in a skip row configuration. I.e., referring to the plants P, it may be seen that two of the furrows are planted with a plant P, whereas the third furrow is blank.

The depiction of the implement having the tool bar 10 is shown by numeral I as going up the field wherein the same tool bar 10 is shown by numeral II as coming down the field and again in numeral III a portion of the same tool bar 10 is shown again going up the field. Therefore, it may be seen that if the plow positions upon the tool bar 10 were lettered A–F that going up the field as in numeral I and III, the plows in position A and D would be at skip or blank rows and, therefore, it is desirable to have the plows in cultivating position so that they will cultivate the blank rows having no plants P planted therein. However, when coming down the field as depicted in numeral II, these same plows in position A and D will be positioned at planted rows containing plants P and, therefore, it is desirable to have them in a non-cultivating position so that the plants P will not be destroyed. Likewise, when going up the field, the plows in position C and F will be located over plants and it is desired that these plows be in the up or non-cultivating position, however, when coming down the field as shown in numeral II, they should be in the down or cultivating position.

This is the problem which has existed and has been known in the prior art before my invention. It will be understood that when I use the word "plow", I mean to include any of various cultivating implements, e.g., including sweeps, as illustrated in the drawing, or chisels, discs, listers, etc.

Figure 5:
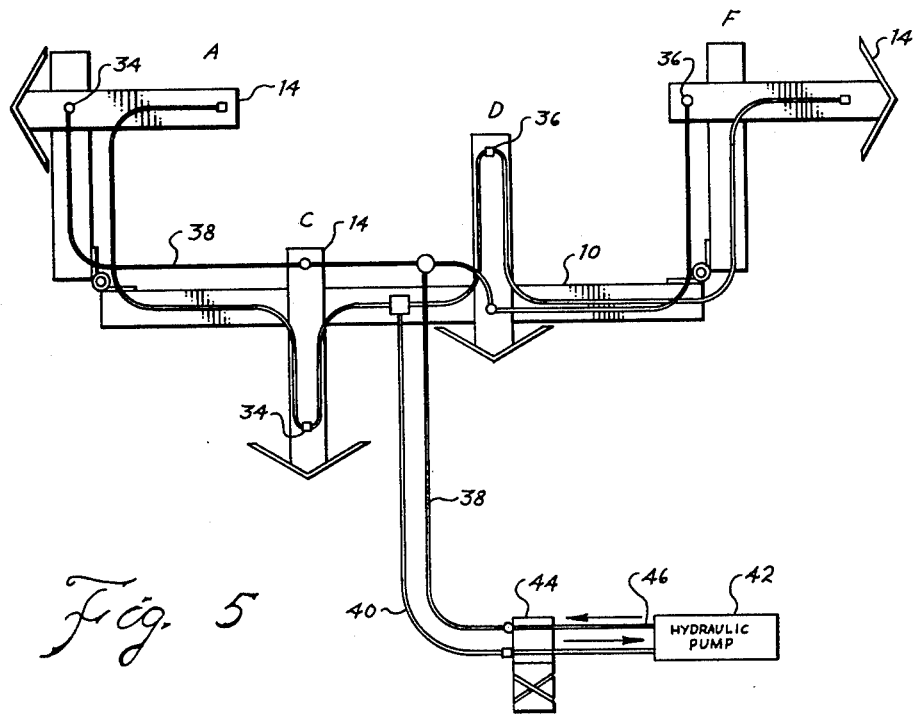
FIG. 5 is a schematic representation showing the connection of the hydraulic hose line from the source of hydraulic fluid to the hydraulic cylinders on a folded tool bar.

Also, the drawing, and particularly the schematic representations of FIGS. 1 and 5, show only those plow shanks which are alternately over planted rows or blank rows. It will be understood that the tractor or other draft implement carrying the tool bar 10 would probably carry many other implements as well, I.e., it would also carry other plows to cultivate around the planted crops P or the middle of the rows between the planted crops P or to perform other agricultural procedures besides cultivation. However, inasmuch as those farmers having ordinary skill in the art will understand that multiple cultivating implements can be carried either on tool bar 10 or upon another tool bar connected to the same tractor, they have not been illustrated here for clarity of the description and drawing.

Figure 4:
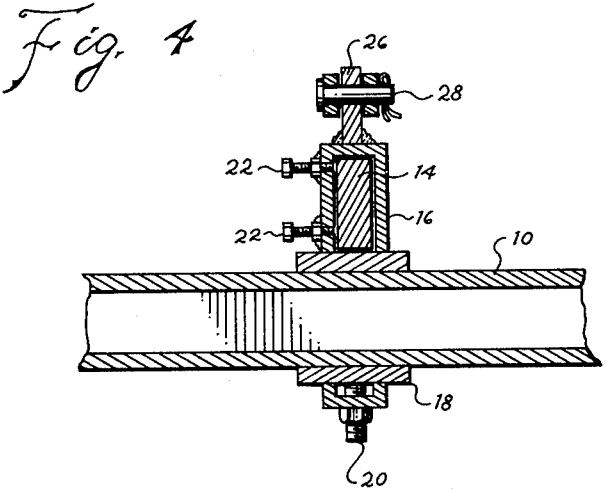
FIG. 4 is a sectional view taken substantially upon line 4—4 of FIG. 2.

Each of the plows 12 in the form of sweeps are mounted in customary manner upon plow shank 14. The plow shanks 14 are normal plow shanks except they are elongated to provide for not only the necessary movement up and down but also for the connection and space of the hydraulic cylinder. The plow shanks 14 have a rectangular cross section as particularly seen in FIG. 4. The plow shanks telescope or slide through loop 16 attached to tool bar clamp 18. The clamp 18 is attached to the tool bar 10 by bolts 20 as is customary in attaching implements to a tool bar. The loop 16 is of correlative shape to the shank 14, thus it also has a rectangular cross section. Two set screws 22 extend through the loop so the shank may be locked in some position and not be adjustable as hereinafter described.

Hydraulic cylinder 24 is connected at its lower end to ear 26 which is connected as by welding to the front of loop 16. As is customary, the cylinder may be connected by pin 28. The top of the cylinder, which is to say the ram thereof, is connected by similar pin to ear 30 of shank clamp 32.

Figure 2:
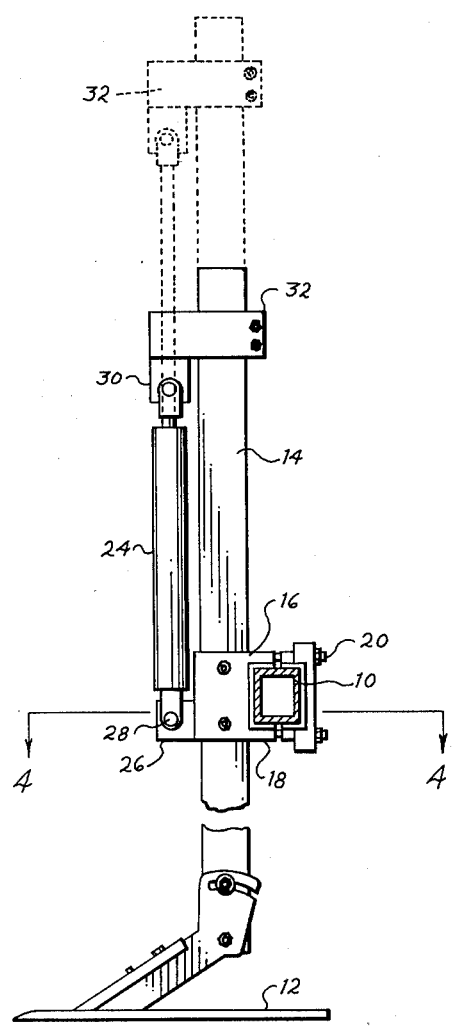
FIG. 2 is a side elevational view of one shank assembly according to this invention, attached to the tool bar which is shown in section.
Figure 3:
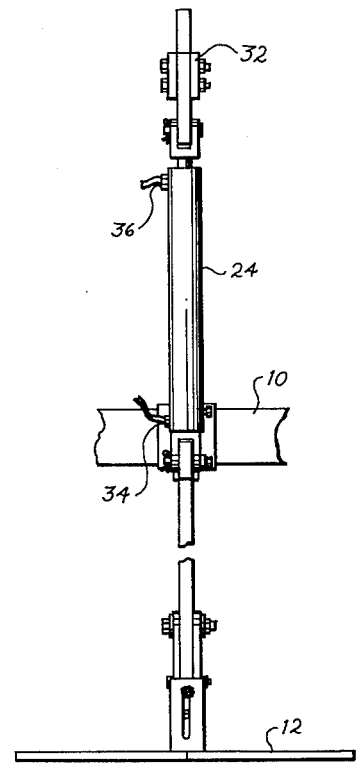
FIG. 3 is a front elevational view of one shank assembly according to this invention which is attached to the tool bar which is broken away.

The shank clamp is connected to the top of the shank 14 by conventional manner, e.g., by bolts. As may be seen and understood, each of the cylinders 24 has a down position which is the fully contracted position, as shown in FIGS. 2 and 3 in which position, the plow 12 attached to the bottom of the shank is in the cultivating position. Also, each cylinder will have an expanded or up position wherein the plow on the bottom of the shank is in the raised or non-cultivating position. In the non-cultivating position, it might be said that the plow is out of the cultivating position. The up position of the cylinder 24 is shown by dashed lines in FIG. 2 although the shank is shown in the up position, the plow 12 has not been shown for clarity.

Each cylinder has two hydraulic connections thereon which have been designated as up connection 34 and down connection 36. When hydraulic pressure is applied to the up connection 34, it will cause the cylinder to move into the up position, as seen in dashed lines in FIG. 2. When hydraulic pressure is applied to the down connection, the cylinder will be moved to the down position with the plow 12 in cultivating position.

First hose line 38 is connected to the up connection of half the cylinders. Referring to FIG. 5, if the cylinders are designated by the same letter by which the plows are designated in FIG. 1, it may be seen that the first hose line 38 is connected to the up connection of cylinders A and D. Also, it may be seen that the first hose line 38 is connected to the down connection of cylinders C and F. Second hose line 40 is connected to the connections which are not connected to the first hose line. Therefore, the second hose line is connected to the down connection of A, up connection of C, down connection of D and up connection of F. Therefore, it may be seen that one hose line is connected to every other one of the cylinders as they are spaced along the horizontal tool bar.

The hydraulic fluid from a source of hydraulic fluid under pressure in the form of outlet 46 from pump 42 is connected by valve 44 so that either the first hose line 38 or the second hose line 40 is pressurized.

As an aid to correlating the terms of the claims to the exemplary drawing, the following catalog of elements is provided:

| Plants - P | |
|---|---|
| 10 tool bar | 30 ear |
| 12 plows | 32 shank clamp |
| 14 plow shank | 34 up connection |
| 16 loop | 36 down connection |
| 18 tool bar clamp | 38 first hose line |
| 20 bolts | 40 second hose line |
| 22 set screws | 42 pump |
| 24 hydraulic cylinder | 44 valve |
| 26 ear | 46 outlet |
| 28 pin | |

The embodiment shown and described above is only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:

1. In a skip row cultivator having
   a. an elongated horizontal tool bar,
   b. a plurality of moveable plow shanks on the tool bar,
   c. a plow on the bottom of each moveable shank; wherein the improvement comprises the following structure for moving the plows into cultivating position:
   d. a hydraulic cylinder interconnecting each shank and the tool bar,
   e. each cylinder having
      (i) an up position wherein the plow on the shank is out of cultivating position, and
      (ii) a down position wherein the plow on the shank is in cultivating position, f. each cylinder having
  (i) an up connection wherein if hydraulic pressure is applied thereto the cylinder is moved to the up position, and
  (ii) a down connection wherein if hydraulic pressure is applied thereto the cylinder is moved to the down position,
g. a first hose line connected to the up connection on half the cylinders and the down connection on the remainder of the cylinders,
h. a second hose line connected to the other connections,
j. a source of hydraulic fluid under pressure, and
k. a valve connecting the source of fluid selectively to the first or second hose lines.

2. The invention as defined in claim 1 further comprising:
m. the first line connected alternately to up connections and down connections as the hydraulic cylinders are spaced along the tool bar.

3. The invention as defined in claim 1 further comprising:
m. a tool bar clamp attached to the tool bar in adjustable horizontal position,
n. a loop on the tool bar clamp,
o. one of said shanks telescoped through the loop,
p. a shank clamp on the top of the shank, and
q. one of said hydraulic cylinders connecting the shank clamp and tool bar clamp.

4. The invention as defined in claim 1 further comprising:
m. said tool bar being a folded tool bar with a wing attached on each end of the central portion of the tool bar and the wings foldable upward,
n. at least one of said moveable plow shanks mounted upon a wing,
o. said hose line providing a flexible connection when the wing is folded up or folded down.

5. The invention as defined in claim 4 further comprising:
p. the first line connected alternately to up connections and down connections as the hydraulic cylinders are spaced along the tool bar.

6. The invention as defined in claim 5 further comprising:
q. a tool bar clamp attached to the tool bar in adjustable horizontal position,
r. a loop on the tool bar clamp,
s. one of said shanks telescoped through the loop,
t. a shank clamp on the top of the shank, and
u. one of said hydraulic cylinders connecting the shank clamp and tool bar clamp.

7. The invention as defined in claim 6 further comprising:
v. said loop and shanks having correlative rectangular cross-sections,
w. set screws threaded through said loops so the shank can be locked in a selected position.

8. In a skip row cultivator having:
a. an elongated horizontal tool bar,
b. at least one plow shank on the tool bar,
c. a plow on the bottom of each moveable shank; wherein the improvement comprises the following structure for moving plows into cultivating position:
d. a tool bar clamp attached to the tool bar in adjustable horizontal position,
e. a loop on the tool bar clamp,
f. said shank telescoped through the loop,
g. a shank clamp on the top of the shank, and
h. a hydraulic cylinder connecting the shank clamp and tool bar clamp.

9. The invention as defined in claim 8 further comprising:
j. said loop and shanks having correlative rectangular cross-sections,
k. screws threaded through said loops so the shank can be locked in a selected position.

10. In a skip row cultivator having
a. an elongated horizontal tool bar,
  (i) said tool bar having a wing on each end of the central portion thereof,
  (ii) said wings being foldable upward,
b. a plurality of moveable plow shanks on the tool bar, each wing carrying at least one of said moveable plow shanks,
c. a plow on the bottom of each moveable shank; wherein the improvement comprises the following method of moving the plows into cultivating position:
d. connecting a hydraulic cylinder between each shank and the tool bar,
e. moving each shank up and down by its hydraulic cylinder,
f. connecting every other hydraulic cylinder by a first flexible hose so that pressure in the hydraulic hose will move the shanks into a down position,
g. connecting the remaining cylinder by a second flexible hose so that pressure in the second hose will move the remaining shanks into a down position, and
h. pressurizing one or the other hose.

* * * * *